Patented Aug. 22, 1944

2,356,471

UNITED STATES PATENT OFFICE 2,356,471

METHOD OF MAKING FINE PARTICLE SIZE CARBON BLACK

John Rehner, Jr., Wadsworth, Ohio, assignor to The B. F. Goodrich Company, New York, N. Y., a corporation of New York No Drawing. Application August 29, 1941
Serial No. 408,840

3 Claims. (Cl. 23—209.8)

This invention relates to a method of making carbon black having a small, uniform particle size and to the product so produced.

Carbon black, which is widely used in many branches of modern industry, finds employment in most cases not only because of its color but also because it can be produced in particles of very fine particle size. As a usual thing the finer the size of the black the more useful it is. The modern way to make carbon black is to burn a hydrocarbon gas in an atmosphere containing insufficient oxygen for complete combustion and then to collect the particles of unburned carbon on a cool surface. This is the so-called impingement process.

I have discovered that carbon black can now be made with even finer sized individual particles by introducing any of the metal carbonyls into the hydrocarbon gas and burning the mixture. The procedure used in burning is the same as the present inpinging process and a carbon black is produced with a particle size smaller and more uniform than any that has heretofore been produced by the impinging process.

In practicing the method of the present invention I mix with the hydrocarbon gas a metal carbonyl such as cobalt carbonyl, iron carbonyl, nickel carbonyl, chromium carbonyl, and the like and burn the mixture, collecting the carbon black on a cool impinging surface. By far the best of these materials is iron carbonyl.

As an example of this invention illuminating gas is bubbled through iron carbonyl and then burned in an ordinary carbon black burner. The carbon black that is produced is found on examination by means of an ordinary microscope to have an average particle size of about 0.1 micron. Carbon black produced from the same gas in the same burner without using the carbonyl has an average particle size of about 0.3 micron. This reduction in size is very important where the carbon black is used for such purposes as paint making and rubber compounding.

Having disclosed my invention together with a list of typical materials that may be used therein it is my intention that the invention not be limited to these particular materials nor to any specific method of applying the principles of this invention but rather it is the intention to protect the invention broadly within the spirit and scope of the appended claims.

I claim:

1. The method of making a carbon black having a fine particle size which comprises introducing a metal carbonyl into a hydrocarbon gas in an amount such as can be introduced by bubbling the gas through a liquefied metal carbonyl, burning the mixture in an atmosphere containing insufficient oxygen for complete combustion, and collecting the carbon black so produced.

2. The method of making a carbon black having a fine particle size which comprises introducing iron carbonyl into a hydrocarbon gas in an amount such as can be introduced by bubbling the gas through iron carbonyl, burning the mixture in an atmosphere containing insufficient oxygen for complete combustion, and collecting the carbon black so produced.

3. The method of making a carbon black having a fine particle size which comprises bubbling a hydrocarbon gas through iron carbonyl, burning the gas in an atmosphere containing insufficient oxygen for complete combustion, and collecting the carbon black on a cool surface.

JOHN REHNER, JR.